(12) United States Patent
Zhu et al.

(10) Patent No.: US 8,934,411 B2
(45) Date of Patent: Jan. 13, 2015

(54) METHOD AND SYSTEM FOR ACCESSING LOCAL NETWORK BY MOBILE TERMINAL VIA HOME BASE STATION SYSTEM

(75) Inventors: Huifen Zhu, Guangdong Province (CN); Jin Xi, Guangdong Province (CN); Lin Liu, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 580 days.

(21) Appl. No.: 13/258,107

(22) PCT Filed: Jun. 17, 2010

(86) PCT No.: PCT/CN2010/074024
§ 371 (c)(1),
(2), (4) Date: Nov. 17, 2011

(87) PCT Pub. No.: WO2010/145550
PCT Pub. Date: Dec. 23, 2010

(65) Prior Publication Data
US 2012/0051348 A1 Mar. 1, 2012

(30) Foreign Application Priority Data
Jun. 19, 2009 (CN) .......................... 2009 1 0149931

(51) Int. Cl.
*H04W 4/00* (2009.01)
*H04W 76/02* (2009.01)
(Continued)

(52) U.S. Cl.
CPC ............ *H04W 76/022* (2013.01); *H04W 8/082* (2013.01); *H04W 24/02* (2013.01); *H04W 84/045* (2013.01)
USPC .......................................... 370/328; 370/338

(58) Field of Classification Search
None
See application file for complete search history.

(56) References Cited

U.S. PATENT DOCUMENTS

| 2009/0232019 A1* | 9/2009 | Gupta et al. .................. 370/252 |
| 2010/0272013 A1* | 10/2010 | Horn et al. .................... 370/328 |
| 2012/0046058 A1* | 2/2012 | Vesterinen et al. ........... 455/509 |

FOREIGN PATENT DOCUMENTS

| CN | 101310549 A | 11/2008 |
| CN | 101335984 A | 12/2008 |

(Continued)

OTHER PUBLICATIONS

3GPP TSG WG2 Meeting #72; TD S2-091989; "Architecture alternative for Local IP access" Mar. 30-Apr. 3, 2009.*

(Continued)

*Primary Examiner* — Derrick Ferris
*Assistant Examiner* — Kodzovi Acolatse
(74) *Attorney, Agent, or Firm* — Ling Wu; Stephen Yang; Ling and Yang Intellectual Property (57) ABSTRACT

A method and system for accessing a local network by a mobile terminal via a home base station system are provided. The method comprises: a home base station subsystem, in which the mobile terminal is located, sending an ID of a local gateway module in the home base station subsystem to a core network management network element, and the core network management network element determining that the mobile terminal needs to access the local network, and setting up a GPRS tunneling control bearer with the home base station subsystem according to the ID, so that the mobile terminal can access the local network via the home base station subsystem. The method and the system makes the core network acquire the address of the local GGSN/PDN-GW corresponding to the home base station without manual configuration, thus reducing the complexity of the network configuration.

17 Claims, 4 Drawing Sheets

(51) Int. Cl.
*H04W 8/08* (2009.01)
*H04W 24/02* (2009.01)
*H04W 84/04* (2009.01)

(56) References Cited

FOREIGN PATENT DOCUMENTS

| CN | 101437223 A | 5/2009 |
|---|---|---|
| WO | 2007104324 A1 | 9/2007 |

OTHER PUBLICATIONS

"Addressing Options for S1 inter-HeNB Handovers"; 12.4, Mitsubishi Electric, Discussion & Approval; 3GPP TSG RAN WG3 Meeting #63bis Seoul, South Korea, Mar. 23-26, 2009; R3-090767; XP50341153A; see pp. 1-4.

"ANRF in Campus Scenarios"; 12.4, Mitsubishi Electric, Discussion & Approval; 3GPP TSG RAN WG3 Meeting #63bis Seoul, South Korea, Mar. 23-26, 2009; R3-090766; XP50341152A; see pp. 1-5.

"Architecture alternative for Local IP access"; NEC, 7.4.6, EHNB/Rel-9; 3GPP TSG SA WG2 Meeting #72, Mar. 30-Apr. 3, 2009, Hangzhou, China; TD S2-091989; XP50345321A; see pp. 1-5.

"Local IP access baseline solution for EHNB"; Qualcomm Europe; Approval, 7.4.6, EHNB / Release 9; 3GPP TSG SA WG2 Meeting #72, Mar. 30-Apr. 3, 2009, Hangzhou, China; TD S2-092308; XP50345597A; see pp. 1-6.

International Search Report for PCT/CN2010/074024 dated Sep. 7, 2010.

\* cited by examiner

FIG. 8

METHOD AND SYSTEM FOR ACCESSING LOCAL NETWORK BY MOBILE TERMINAL VIA HOME BASE STATION SYSTEM

TECHNICAL FIELD

The present invention relates to wireless communication network, and more particularly, to a method and system for accessing a local network by a mobile terminal via a home base station system.

BACKGROUND OF THE RELATED ART

A home base station, as a small scale base station installed at home or in office area, is called a home NodeB (HNB) in the 3rd generation (3G) mobile communication system and a home eNodeB (HeNB) in a long term evolution (LTE) system, and can be simplified as H(e)NB for both. In order to reduce the effect to a core network (CN), a home base station gateway is introduced in the home base station system, which is called HNB GW in the 3G system and H(e)NB GW in the LTE system.

Figure 1:
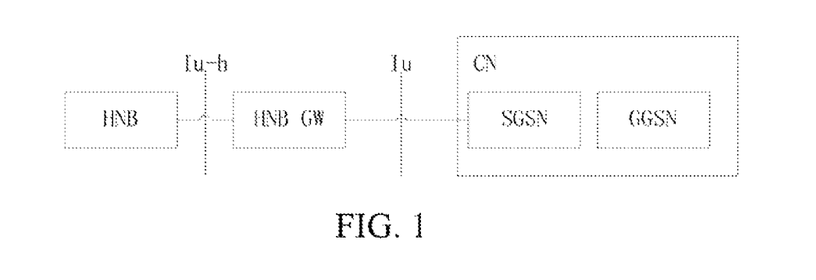
FIG. 1 is an architectural diagram of a home base station network in a 3G system.

As shown in FIG. 1, the HNB and the HNB GW in the 3G system are network elements in a access network, while serving GPRS (general packet radio service) supporting node (SGSN) and gateway GPRS supporting node (GGSN) are network elements in the CN. The interface between the wireless access network and the core network inherits from the interface between a macro base station and the core network and is also an Iu interface whose physical connection exists in the home base station gateway. From a logical point of view, an application layer protocol of the Iu interface is that a radio access network application part (RANAP) might be distributed in the home base station or the home base station gateway or both, and control messages between the SGSN and the GGSN that are the network elements in the core network use a GPRS tunneling protocol-control (GTP-C) signaling.

Figure 2:
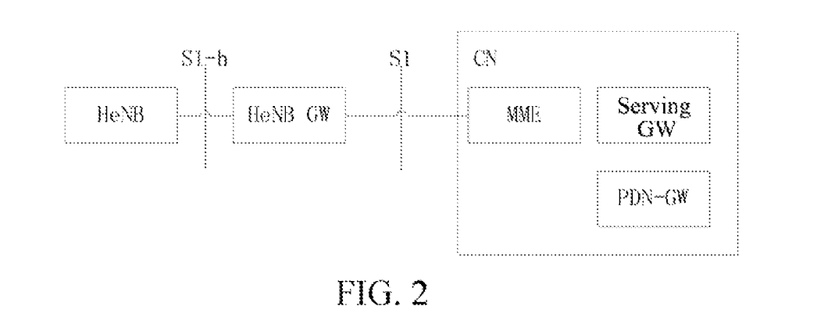
FIG. 2 is an architectural diagram of a home base station network in a LTE system.
Figure 3:
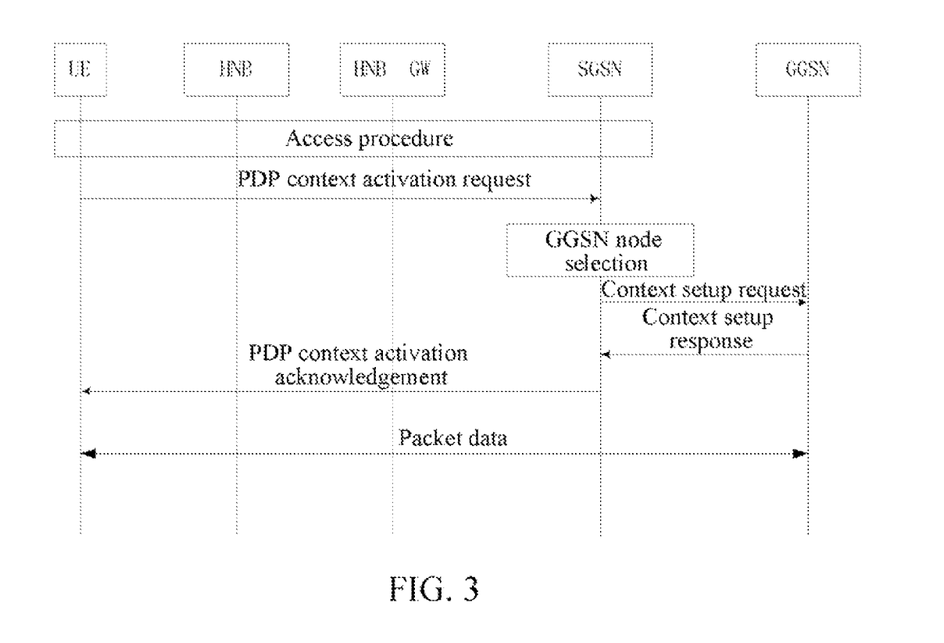
FIG. 3 is a flow chart of a mobile terminal initiating data in a 3G system.

As shown in FIG. 2, the HeNB and the HeNB GW in the LTE system are network elements in the access network, while a mobility management entity (MME), a serving GW and a packet data network gateway (PDN-GW) are network elements in the core network. The interface between the wireless access network and the core network inherits from the interface between the macro base station and the core network and is also a S1 interface whose physical connection exists in the home base station gateway. From a logical point of view, the S1 interface application layer protocol is S1-AP (S1 application part) that might be distributed in the home base station or the home base station gateway or both, and control messages between the MME and the Serving GW, as well as between the Serving GW and the PDN-GW that are the network elements in the core network use the GTP-C signaling.

For normal mobile services, a mobile terminal (user equipment, UE) initiates a service process via the home base station, and this process has a little distinction from a service process via the macro base station. As shown in FIG. 1, in the 3G system, the procedure for the mobile terminal initiating a data service comprises: after the UE accesses the SGSN, the UE sends a packet data protocol (PDP) context activation request to the SGSN, and the request carries an access point name (APN) of the mobile terminal, that is because for different access points the SGSN might select different GGSN to access. The SGSN acquires address information of the corresponding GGSN node from a database or a server according to the acquired APN of the mobile terminal, and sends a context setup request to the corresponding GGSN; and the GGSN returns a context setup response, then the SGSN returns a PDP context activation acknowledgement to the UE to set up a route between the MS and the GGSN, so as to transmit packet data.

The home base station is a part of a public land mobile network (PLMN), and it can provide general mobile services for the mobile terminal user; meanwhile, the home base station is a part of the home internal network, so it also should provide the service of accessing the home network for the mobile terminal. Since the home base station already connects to the Internet, for pure surfing service, there is no need to access the Internet via the PLMN core network, and the mobile terminal can directly access the Internet via the home base station completely. Based on the above demands, the 3rd Generation Partnership Project (3GPP) proposed local IP access to provide a method for accessing the home network and directly accessing the services in the Internet via the home base station for the mobile terminal user.

According to the requirements of 3GPP, for all the mobile terminal users that are allowed to access the home base station, the local IP function can be used (on the premise that an operator agrees), that is because the implementation scheme has to not change functions of the mobile terminal users. In one implementation, i.e., when the home base station integrates a part of GGSN functions to work as a local GGSN, for a special APN, the mobile terminal indicates to use a local network access function by selecting the APN. According to the existing method, when the SGSN receives the APN including indicating the local access, the SGSN needs to acquire the address of the local GGSN according to the APN and initiate a bearer setup procedure to the local GGSN. Since the home base station is a user equipment, its address information is not included in a network planning range by the operator or its maintenance cost is extremely high. In this condition, the network elements in the core network cannot directly acquire the IP address of the home base station just according to the APN so as to initiate the bearer setup procedure to the local GGSN bond to the home base station, which is also the problem existing in the LTE home base station system so that the mobile terminal cannot access the local network via the home base station.

CONTENT OF THE INVENTION

The present invention provides a method and system for accessing a local network by a mobile terminal via a home base station system, and in the condition that GGSN functions are integrated in the home base station, the mobile terminal can access the local network via the home base station.

In order to solve the above-mentioned problem, the present invention provides a method for accessing a local network by a mobile terminal via a home base station system, and the method comprises: a home base station subsystem, in which the mobile terminal is located, sending an identification of a local gateway module in the home base station subsystem to a core network management network element, and the core network management network element determining that the mobile terminal needs to access the local network, and then setting up a GPRS tunneling control bearer with said home base station subsystem according to the identification, so that the mobile terminal is able to access the local network via the home base station subsystem.

The above-mentioned method might also have the following feature:

in a 3rd generation mobile communication system, the home base station subsystem comprises a home base station, the local gateway module is a local GGSN bond to the home base station, and said core network management network element is a SGSN;

the step of the home base station subsystem, in which the mobile terminal is located, sending the identification of the local gateway module in the home base station subsystem to the core network management network element comprises: after said mobile terminal sets up a radio resource control connection with the home base station, said home base station sending an Iu interface message to the SGSN, and carrying the identification of the local GGSN in the message;

the step of said core network management network element setting up a GPRS tunneling control bearer with the home base station subsystem according to the identification comprises: after said SGSN acquires the identification of the local GGSN, said SGSN initiating and setting up the GPRS tunneling control bearer to the local GGSN.

The above-mentioned method might also have the following feature:

in a long term evolution system, the home base station subsystem comprises a home base station, the local gateway module is a local packet data network gateway bond to the home base station, and said core network management network element is a MME;

the step of the home base station subsystem, in which the mobile terminal is located, sending the identification of the local gateway module in the home base station subsystem to the core network management network element comprises: after said mobile terminal sets up a radio resource control connection with the home base station, said home base station sending an S1 interface message to the MME, and carrying the identification of the local packet data network gateway in the message;

the step of said core network management network element setting up a GPRS tunneling control bearer with the home base station subsystem according to the identification comprises: after said MME acquires the identification of the local packet data network gateway, the MME initiating and setting up the GPRS tunneling control bearer to the local packet data network gateway.

The above-mentioned method might also have the following feature:

in a long term evolution system, the home base station subsystem comprises a home base station and a home base station gateway, said local gateway module is the home base station gateway connecting to the home base station, and said core network management network element is a MME;

said method further comprises: in the procedure of said home base station initiating a registration procedure to the home base station gateway, notifying the home base station gateway of an IP address used to set up the GPRS tunneling control bearer by the home base station gateway;

the step of the home base station subsystem, in which the mobile terminal is located, sending the identification of the local gateway module in the home base station subsystem to the core network management network element comprises: after the mobile terminal sets up a radio resource control connection with the home base station, said home base station gateway sending an S1 interface message to the MME, and carrying the IP address used to set up the GPRS tunneling control bearer by the home base station gateway in the message.

The above-mentioned method might also have the following feature:

after said home base station subsystem sends the identification of the local gateway module to the core network management network element, said method further comprises:

said mobile terminal initiating a packet data protocol context request message to the core network management network element, and carrying an access point representing a local access in the message;

the step of said core network management network element determining that the mobile terminal needs to access the local network comprises: said core network management network element determining that the mobile terminal needs to access the local network according to said access point.

The above-mentioned method might also have the following feature:

said Iu interface message is an initial mobile terminal message, an uplink direct transmission message, a relocation request acknowledgement message or a relocation fulfillment message.

The above-mentioned method might also have the following feature:

said S1 interface message is an initial mobile terminal message, an uplink non-access stratum transmission message, a switch request acknowledgement message or a switch notification message.

In order to solve the above-mentioned technical problem, the present invention also provides a system for accessing a local network by a mobile terminal via a home base station system, and the system comprises a home base station subsystem in which the mobile terminal is located and a core network management network element; wherein, said home base station subsystem is configured to: send an identification of a local gateway module in the home base station subsystem to the core network management network element; and said core network management network element is configured to: when determining that the mobile terminal needs to access the local network, set up a GPRS tunneling control bearer with said home base station subsystem according to said identification, so that the mobile terminal is able to access the local network via the home base station subsystem.

The above-mentioned system might also have the following feature:

In a 3rd generation mobile communication system, the home base station subsystem comprises a home base station, the local gateway module is a local GGSN bond to the home base station, and said core network management network element is a SGSN;

said home base station is configured to: after setting up a radio resource control connection with the mobile terminal, send an Iu interface message to the SGSN, and carry the identification of the local GGSN in the message;

said SGSN is configured to: after acquiring the identification of the local GGSN, initiate and set up the GPRS tunneling control bearer to the local GGSN.

The above-mentioned system might also have the following feature:

in a long term evolution system, the home base station subsystem comprises a home base station, the local gateway module is a local packet data network gateway bond to the home base station, and said core network management network element is a MME;

said home base station is configured to: after setting up a radio resource control connection with the mobile terminal, send an S1 interface message to the MME, and carry the identification of the local packet data network gateway in the message;

said MME is configured to: after acquiring the identification of the local packet data network gateway, initiate and set up a GPRS tunneling control bearer to the local packet data network gateway.

The above-mentioned system might also have the following feature:

in a long term evolution system, the home base station subsystem comprises a home base station and a home base station gateway, said local gateway module is the home base station gateway connecting to the home base station, and said core network management network element is a MME;

said home base station is configured to: in the procedure of initiating a registration procedure to the home base station gateway, notify an IP address used to set up the GPRS tunneling control bearer by the home base station to the home base station gateway;

said home base station gateway is configured to: after the mobile terminal sets up a radio resource control connection with the home base station, send an S1 interface message to the MME, and carry the IP address used to set up the GPRS channel control bearer by the home base station gateway in the message;

said MME is configured to: after acquiring the IP address used to set up the GPRS tunneling control bearer by the home base station gateway, initiate and set up the GPRS tunneling control bearer to the home base station gateway.

The above-mentioned system might also have the following feature:

the core network management network element is further configured to: receive a packet data protocol context request message sent by the mobile terminal, wherein the message carries an access point representing a local access, and determine that the mobile terminal needs to access the local network via the access point.

With the present invention, without manual configuration, the core network can acquire the address of the local GGSN/PDN GW corresponding to the home base station, thereby reducing the complexity of the network configuration; moreover, the present invention allows to dynamically configure the address of the local GGSN/PDN GW for the home base station, thus it is more suitable for massive home base station devices whose locations and operating time cannot be strictly controlled.

PREFERRED EMBODIMENTS OF THE PRESENT INVENTION

A mobile terminal accesses a local network system via a home base station, and the local network system comprises a home base station subsystem in which the mobile terminal is located and a core network management network element;

The home base station subsystem is used to send an identification of a local gateway module in the home base station subsystem to the core network management network element;

The core network management network element is used to set up a GPRS tunneling control bearer with the home base station subsystem according to the identification, so that the mobile terminal is able to access the local network via the home base station subsystem.

The first embodiment

Figure 4:
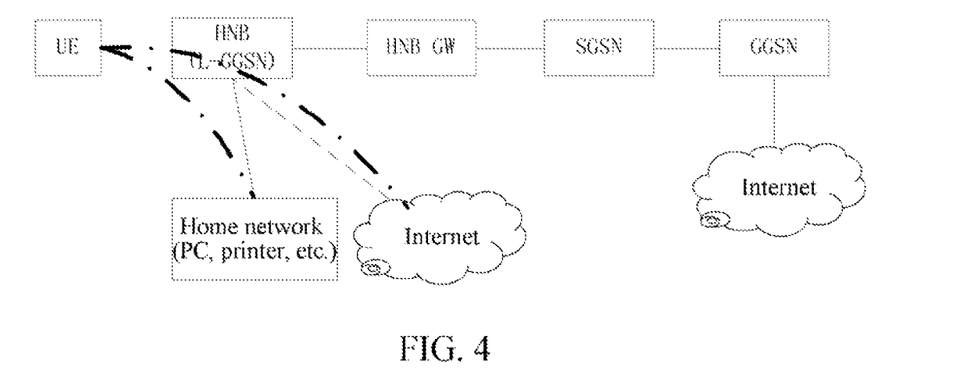
FIG. 4 is a schematic diagram of a mobile terminal performing local IP access in a 3G system in accordance with a first embodiment.

As shown in FIG. 4, in the 3G system, the home base station subsystem comprises a home base station, the local gateway module is a local GGSN bond to the home base station, and the core network management network element is a SGSN. The GTP-C channel is terminated at the home base station, thus it requires the home base station supports the GTP-C protocol while the home base station gateway may not support the GTP-C protocol. The local GGSN module contained in the home base station is used to implement all or a part of the GGSN network element functions, such as saving a PDP context, assigning an IP address to the UE and working as a gateway of a mobile network and an external data network.

Figure 5:
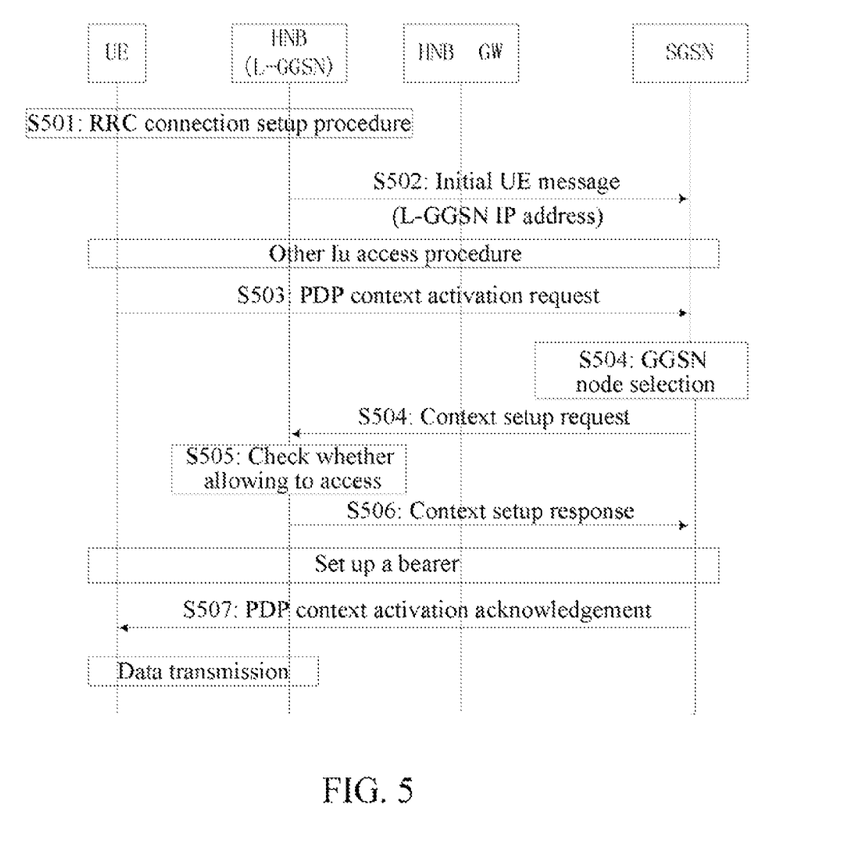
FIG. 5 is a flow chart of a method for accessing a local network by the mobile terminal via a home base station in accordance with the first embodiment.

As shown in FIG. 5, the method for accessing the local network by the mobile terminal via the home base station comprises the following steps:

Step 501, the UE initiates a radio resource control (RRC) connection setup request to the c.

Step 502, the home base station sends an initial UE message to the SGSN, where the message contains the identification of the local GGSN bond to the HNB.

The identification of the local GGSN might be the IP address, or other identification, such as a fully qualified domain name (FQDN), in which the IP address can be extracted.

Where there is a home base station gateway, in a practical process, the message sent by the home base station to the SGSN is forwarded to the SGSN via the home base station gateway, which is already known in the prior art.

In this step, the address of the local GGSN is added by the home base station to the initial UE message, and in another condition, the address can also be added by the home base station gateway to the initial UE message; specifically: the home base station locally configures the address of the local GGSN, and the mobile terminal performs network address conversion when accessing the mobile network, and the home base station gateway takes the converted address as the local GGSN address and adds to the initial UE message.

Step 503, the UE initiates a PDP context activation request to the SGSN, where the request carries the APN representing the local access.

Step 504, the SGSN receives the PDP context activation request and determines that the UE needs to access the local network according to the APN, and then the SGSN initiates a bearer setup procedure to the HNB.

The above-mentioned "initiating the bearer setup procedure to the HNB" is practically initiating a bearer setup procedure (sending a context setup request) to the local GGSN bond to the HNB, and the target IP address is the address acquired in step 502 and this process uses the GTP-C protocol.

Step 505, the local GGSN bond to the HNB performs admission control to the mobile terminal user according to identification of the mobile terminal user, such as an international mobile subscriber identity (IMSI) or a mobile station international ISDN number (MSISDN); and if the access is allowed, a successful response is returned to the SGSN, otherwise, a failure response is returned.

This step is optional.

Step 506, the local GGSN bond to the HNB assigns an IP address to the UE and sends the IP address to the SGSN.

Step 507, the SGSN sends a PDP context activation accept message to the UE, the PDP context activation procedure ends, and the UE can access the local data network.

In step 502 of the above first embodiment, besides of the initial UE message, other Iu interface message or connection-oriented message, such as a uplink direct transmission message, a relocation request acknowledgement or a relocation fulfillment message, can be used.

The second embodiment

Figure 6:
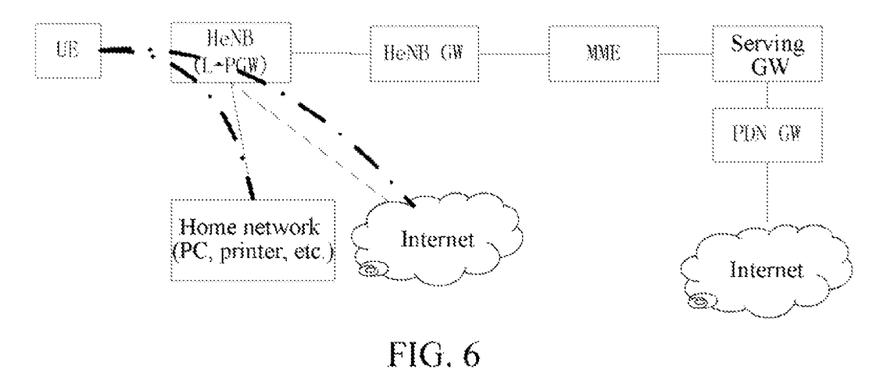
FIG. 6 is a schematic diagram of a mobile terminal performing local IP access in a LTE system in accordance with a second embodiment.

As shown in FIG. 6, in the LTE system, the home base station subsystem comprises a home base station, the local gateway module is the local PDN-GW bond to the home base station, and the core network management network element is a MME. The home base station contains a local PDN-GW (L-PGW) module to implement all or a part of the PDN-GW network element functions, such as saving a packet data connection context information, assigning an IP address to the UE and working as a gateway of a mobile network and a outernal data network; it might also include a part of Serving GW functions, such as buffering downlink data and triggering a paging and so on, as desired.

In this embodiment, the GTP-C channel is terminated at the home base station, and the method requires that the home base station supports the GTP-C protocol while the home base station gateway does not.

Figure 7:
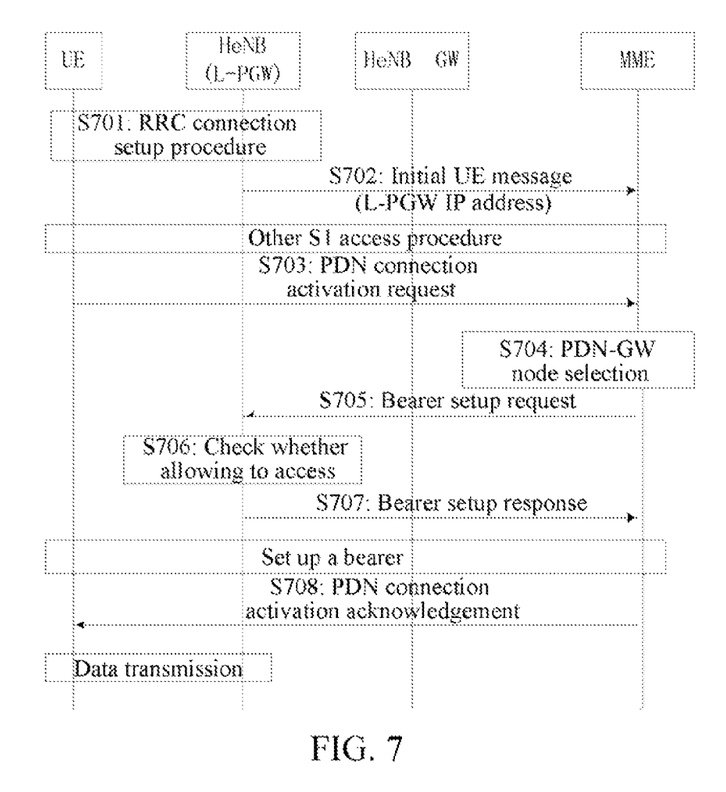
FIG. 7 is a flow chart of a method for accessing a local network by the mobile terminal via a home base station in accordance with the second embodiment.

As shown in FIG. 7, the method for accessing a local network by the mobile terminal via the home base station comprises the following steps.

Step 701, the UE initiates a RRC connection setup request to the home base station.

Step 702, the home base station sends an initial UE message to the MME, and the message includes the identification of the local PDN-GW bond to the HeNB.

The identification of the PDN-GW might be an IP address or other identification, such as a FQDN, that can extract the IP address.

Where there is a home base station gateway, in practical process, sending the message by the home base station to the MME is forwarded via the home base station gateway, which is already known in the prior art.

In this step, the address of the local PDN-GW is added by the home base station to the initial UE message, and in another condition, the address can be added by the home base station gateway to the initial UE message; specifically: the home base station locally configures the address of the local PDN-GW, the mobile terminal performs network address conversion when accessing the mobile network, and the home base station gateway takes the converted address as the local PDN-GW address and adds the address to the initial UE message.

Step 703, the UE sends a PDN connection activation request to the MME, and the request carries the APN representing the local access.

Step 704, the MME receives the PDN connection activation request and determines that the UE needs to access the local network according to the APN, and the MME initiates a bearer setup procedure to the HeNB.

The above-mentioned "initiating a bearer setup procedure to the HeNB" is practically initiating a bearer setup procedure to the local PDN-GW bond with the HeNB, and the target IP address is the address acquired in step 702 and this process uses the GTP-C protocol.

Step 705, the local PDN-GW bond to the HeNB performs admission control to the mobile terminal user according to the identification of the mobile terminal user, such as an IMSI or an MSISDN; if the access is allowed, a successful response is returned to the MME, otherwise, a failure response is returned.

This step is optional.

Step 706, the local PDN-GW bond to the HeNB assigns an IP address to the UE and sends the IP address to the MME.

Step 707, the MME sends a PDN connection activation accept message to the UE, the PDN connection activation process ends, and the UE can access the local data network.

In step 702 of the above-mentioned first second embodiment, besides of the initial UE message, other S1 interface messages or UE related messages, such as an uplink non-access stratum (NAS) transmission message, switch request acknowledgement or switch notification, and so on, can be used.

The third embodiment

In this application, the IP address of the home base station might be a private IP address, and the core network does not need to identify the routing of this address.

Figure 8:
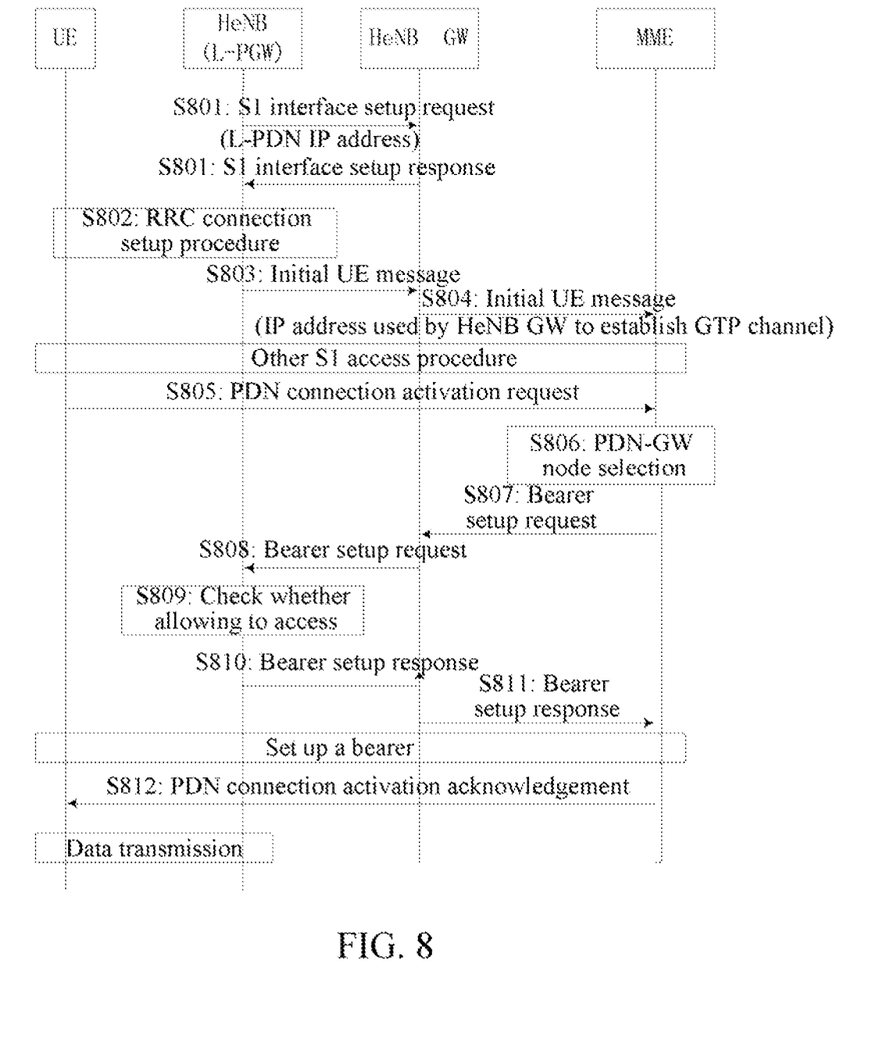
FIG. 8 is a flow chart of a method for accessing a local network by a mobile terminal via a home base station gateway in accordance with a third embodiment.

In this embodiment, in the LTE system, the home base station subsystem comprises a home base station and a home base station gateway, the local gateway module is the home base station gateway connecting to the home base station, and the core network management network element is a MME. The GTP-C channel is terminated at the home base station gateway, and the method requires that both the home base station and the home base station gateway support the GTP-C protocol. A stream control transmission protocol (SCTP) is used between the home base station and the home base station gateway for communication. This embodiment is typically applied in the case that the IP address used to set up a GTP channel by the home base station gateway is different from the SCTP connection address.

As shown in FIG. 8, the method for accessing the local network by the mobile terminal via the home base station comprises the following steps.

Step 801, the home base station initiates a registration procedure to the home base station gateway, and a registration request includes an IP address used to set up the GTP channel by the home base station gateway; and the home base station gateway returns a response message to the home base station.

In the LTE home base station system, the registration procedure multiplexes the S1 setup procedure.

Step 802, the UE initiates a RRC connection setup request to the home base station.

Step 803, the home base station sends an initial UE message to the home base station gateway to trigger the Iu connection setup procedure.

Step 804, the home base station gateway receives the initial UE message, and the home base station gateway includes the IP address used to set up the GTP channel into the initial UE message and sends it to the MME.

Step 805, the UE initiates a PDN connection activation request to the MME, and the request carries the APN representing the local access.

Step 806, the MME receives the PDN connection activation request and determines that the UE needs to access the local network according to the APN.

Step 807, the MME sends a bearer setup request message to the home base station gateway; the message type is GTP-C, and the target address is the IP address used to set up the GTP channel by the home base station gateway, that is, the IP address received from the registration message of the home base station in step 801.

Step 808, the home base station gateway sends a bearer setup request to the home base station.

Step 809, the local GGSN bond to the home base station performs admission control to the mobile terminal user according to the identification of the mobile terminal user, such as an IMSI or an MSISDN; if the access is allowed, it performs the bearer setup proceed, otherwise, a failure response is returned.

This step is optional.

Step 810, the HeNB performs the bearer setup procedure, such as functions that PDN-GW needs to perform, such as storing necessary information, allocating resource, assigning the IP address to the UE; and sends the GTP-C bearer setup response message to the MME.

Step 811, the HeNB GW receives the bearer setup response message, and forwards the message to the MME.

In the subsequent procedure, all GTP-C messages between the MME and the home base station are transmitted via two sections of GTP signaling which are the MME-HeNB GW and the HeNB GW-HeNB, and the procedure is not re-described here.

Step 812, the SGSN sends a PDP context activation accept message to the UE, the PDP context activation procedure ends, and the UE can access the local data network.

In the application scenarios of the above-mentioned third embodiment, if the IP address used to set up the GTP channel by the home base station gateway is the same as the address of the SCTP, there is no need to notify the IP address used to set up the GTP channel by the home base station gateway to the MME.

In the three above-mentioned embodiments, besides of the described method that the mobile terminal makes the core network management network element acquire that the mobile terminal needs to access the local network, by notifying the core network management network element of "access point representing the local access", other methods can be used to make the core network management network element know that the mobile terminal needs to access the local network, thus initiating and setting up a GPRS tunneling control bearer to the local gateway module, which are not re-described here.

Of course, the present invention can also have many other embodiments. For those skilled in the art, it can be understood that there may be a variety of modifications and variations according to the present invention without departing from the spirit and essence of the present invention, and all these types of modifications or variations should include in the scope of the appending claims of the present invention.

INDUSTRIAL APPLICABILITY

With the present invention, without manual configuration, the core network can acquire the address of the local GGSN/PDN GW corresponding to the home base station, thereby reducing the complexity of the network configuration; moreover, the present invention allows to dynamically configure the address of the local GGSN/PDN GW for the home base station, thus it is more suitable for massive home base station devices whose locations and operating time cannot be strictly controlled.

What is claimed is:

1. A method for accessing a local network by a mobile terminal via a home base station system, comprising:
   a home base station subsystem, in which the mobile terminal performing a local Internet Protocol (IP) access is located, sending an identification of a local gateway module in the home base station subsystem to a core network management network element; and
   the core network management network element determining that the mobile terminal needs to access the local network, and then setting up a general packet radio service, GPRS, tunneling control bearer with said home base station subsystem according to the identification, so that the mobile terminal is able to access the local network via the home base station subsystem;
   wherein,
   after said home base station subsystem sends the identification of the local gateway module to the core network management network element, said method further comprises: said mobile terminal initiating a packet data protocol context request message to the core network management network element, and carrying an access point representing a local access in the message;
   the step of said core network management network element determining that the mobile terminal needs to access the local network comprises: said core network management network element determining that the mobile terminal needs to access the local network according to said access point.

2. The method of claim 1, wherein,
   in a 3rd generation mobile communication system, the home base station subsystem comprises a home base station, the local gateway module is a local gateway GPRS supporting node bond to the home base station, and said core network management network element is a serving GPRS supporting node;
   the step of the home base station subsystem, in which the mobile terminal is located, sending the identification of the local gateway module in the home base station subsystem to the core network management network element comprises: after said mobile terminal sets up a radio resource control connection with the home base station, said home base station sending an Iu interface message to the serving GPRS supporting node, and carrying the identification of the local gateway GPRS supporting node in the message;
   the step of said core network management network element setting up a GPRS tunneling control bearer with the home base station subsystem according to the identification comprises: after said serving GPRS supporting node acquires the identification of the local gateway GPRS supporting node, said serving GPRS supporting node initiating and setting up the GPRS tunneling control bearer to the local gateway GPRS supporting node.

3. The method of claim 2, wherein, said Iu interface message is an initial mobile terminal message, an uplink direct transmission message, a relocation request acknowledgement message or a relocation fulfillment message.

4. The method of claim 2, wherein,
   after said home base station subsystem sends the identification of the local gateway module to the core network management network element, said method further comprises: said mobile terminal initiating a packet data protocol context request message to the core network management network element, and carrying an access point representing a local access in the message;
the step of said core network management network element determining that the mobile terminal needs to access the local network comprises: said core network management network element determining that the mobile terminal needs to access the local network according to said access point.

5. The method of claim 1, wherein,
in a long term evolution system, the home base station subsystem comprises a home base station, the local gateway module is a local packet data network gateway bond to the home base station, and said core network management network element is a mobility management entity;
the step of the home base station subsystem, in which the mobile terminal is located, sending the identification of the local gateway module in the home base station subsystem to the core network management network element comprises: after said mobile terminal sets up a radio resource control connection with the home base station, said home base station sending an S1 interface message to the mobility management entity, and carrying the identification of the local packet data network gateway in the message;
the step of said core network management network element setting up a GPRS tunneling control bearer with the home base station subsystem according to the identification comprises: after said mobility management entity acquires the identification of the local packet data network gateway, the mobility management entity initiating and setting up the GPRS tunneling control bearer to the local packet data network gateway.

6. The method of claim 5, wherein, said S1 interface message is an initial mobile terminal message, an uplink non-access stratum transmission message, a switch request acknowledgement message or a switch notification message.

7. The method of claim 5, wherein,
after said home base station subsystem sends the identification of the local gateway module to the core network management network element, said method further comprises: said mobile terminal initiating a packet data protocol context request message to the core network management network element, and carrying an access point representing a local access in the message;
the step of said core network management network element determining that the mobile terminal needs to access the local network comprises: said core network management network element determining that the mobile terminal needs to access the local network according to said access point.

8. The method of claim 1, wherein,
in a long term evolution system, the home base station subsystem comprises a home base station and a home base station gateway, said local gateway module is the home base station gateway connecting to the home base station, and said core network management network element is a mobility management entity;
said method further comprises: in a procedure of said home base station initiating a registration procedure to the home base station gateway, notifying the home base station gateway of an IP address used to set up the GPRS tunneling control bearer by the home base station gateway;
the step of the home base station subsystem, in which the mobile terminal is located, sending the identification of the local gateway module in the home base station subsystem to the core network management network element comprises: after the mobile terminal sets up a radio resource control connection with the home base station, said home base station gateway sending an S1 interface message to the mobility management entity, and carrying the IP address used to set up the GPRS tunneling control bearer by the home base station gateway in the message;
the step of the core network management network element setting up a general packet radio service, GPRS, tunneling control bearer with said home base station subsystem according to the identification comprises: the MME initiates and sets up the GPRS tunneling control bearer to the home base station gateway.

9. The method of claim 8, wherein,
after said home base station subsystem sends the identification of the local gateway module to the core network management network element, said method further comprises: said mobile terminal initiating a packet data protocol context request message to the core network management network element, and carrying an access point representing a local access in the message;
the step of said core network management network element determining that the mobile terminal needs to access the local network comprises: said core network management network element determining that the mobile terminal needs to access the local network according to said access point.

10. The method of claim 8, wherein,
said S1 interface message is an initial mobile terminal message, an uplink non-access stratum transmission message, a switch request acknowledgement message or a switch notification message.

11. A system for accessing a local network by a mobile terminal via a home base station system, comprising a home base station subsystem in which the mobile terminal performing a local Internet Protocol (IP) access is located and a core network management network element; wherein,
said home base station subsystem is configured to: send an identification of a local gateway module in the home base station subsystem to the core network management network element; and
said core network management network element is configured to: when determining that the mobile terminal needs to access the local network, set up a general packet radio service, GPRS, tunneling control bearer with said home base station subsystem according to said identification, so that the mobile terminal is able to access the local network via the home base station subsystem;
wherein,
the core network management network element is further configured to: receive a packet data protocol context request message from the mobile terminal that is sent by the mobile terminal after said home base station subsystem sends the identification of the local gateway module to the core network management network element, wherein the message carries an access point representing a local access, and determine that the mobile terminal needs to access the local network according to the access point.

12. The system of claim 8, wherein, in a 3rd generation mobile communication system, the home base station subsystem comprises a home base station, the local gateway module is a local gateway GPRS supporting node bond to the home base station, and said core network management network element is a serving GPRS supporting node;
said home base station is configured to: after setting up a radio resource control connection with the mobile terminal, send an Iu interface message to the serving GPRS supporting node, and carry the identification of the local gateway GPRS supporting node in the message;

said serving GPRS supporting node is configured to: after acquiring the identification of the local gateway GPRS supporting node, initiate and set up the GPRS tunneling control bearer to the local gateway GPRS supporting node.

13. The system of claim 11, wherein, in a long term evolution system, the home base station subsystem comprises a home base station, the local gateway module is a local packet data network gateway bond to the home base station, and said core network management network element is a mobility management entity;

said home base station is configured to: after setting up a radio resource control connection with the mobile terminal, send an S1 interface message to the mobility management entity, and carry the identification of the local packet data network gateway in the message;

said mobility management entity is configured to: after acquiring the identification of the local packet data network gateway, initiate and set up a GPRS tunneling control bearer to the local packet data network gateway.

14. The system of claim 13, wherein, the core network management network element is further configured to: receive a packet data protocol context request message sent by the mobile terminal, wherein the message carries an access point representing a local access, and determine that the mobile terminal needs to access the local network via the access point.

15. The system of claim 11, wherein, in a long term evolution system, the home base station subsystem comprises a home base station and a home base station gateway, said local gateway module is the home base station gateway connecting to the home base station, and said core network management network element is a mobility management entity;

said home base station is configured to: in a procedure of initiating a registration procedure to the home base station gateway, notify an IP address used to set up the GPRS tunneling control bearer by the home base station to the home base station gateway;

said home base station gateway is configured to: after the mobile terminal sets up a radio resource control connection with the home base station, send an S1 interface message to the mobility management entity, and carry the IP address used to set up the GPRS channel control bearer by the home base station gateway in the message;

said mobility management entity is configured to: after acquiring the IP address used to set up the GPRS tunneling control bearer by the home base station gateway, initiate and set up the GPRS tunneling control bearer to the home base station gateway.

16. The system of claim 11, wherein, the core network management network element is further configured to: receive a packet data protocol context request message sent by the mobile terminal, wherein the message carries an access point representing a local access, and determine that the mobile terminal needs to access the local network via the access point.

17. The system of claim 12, wherein, the core network management network element is further configured to: receive a packet data protocol context request message sent by the mobile terminal, wherein the message carries an access point representing a local access, and determine that the mobile terminal needs to access the local network via the access point.

* * * * *